(12) United States Patent  
Christensen et al.

(10) Patent No.: US 12,326,380 B2  
(45) Date of Patent: Jun. 10, 2025

(54) TESTING DEVICE FOR GEAR MECHANISMS, TESTING METHOD, CONTROL UNIT AND COMPUTER PROGRAM PRODUCT

(71) Applicant: Flender GmbH, Bocholt (DE)

(72) Inventors: Flemming Kjaer Christensen, Skanderborg (DK); Matthias Deicke, Uetze/Schwüblingsen (DE)

(73) Assignees: Flender GmbH, Bocholt (DE); Vestas Wind Systems A/S, Aarhaus N (DK)

( * ) Notice: Subject to any disclaimer, the term of this patent is extended or adjusted under 35 U.S.C. 154(b) by 251 days.

(21) Appl. No.: 17/796,546

(22) PCT Filed: Jan. 11, 2021

(86) PCT No.: PCT/EP2021/050327  
§ 371 (c)(1),  
(2) Date: Jul. 29, 2022

(87) PCT Pub. No.: WO2021/151635  
PCT Pub. Date: Aug. 5, 2021

(65) Prior Publication Data  
US 2023/0047604 A1   Feb. 16, 2023

(30) Foreign Application Priority Data  
Jan. 31, 2020 (EP) .................... 20154842

(51) Int. Cl.  
*G01M 13/02* (2019.01)  
*G01M 13/025* (2019.01)

(52) U.S. Cl.  
CPC ................... *G01M 13/025* (2013.01)

(58) Field of Classification Search  
CPC .. G01M 13/021; G01M 13/02; G01M 13/026; G01M 13/025; G01M 13/028; G01M 13/023; G01M 13/04; G01M 13/00; G01M 7/00; G01M 13/022; G01M 13/027; G01M 17/022; G01M 7/045; G01M 7/08; G01M 15/044; G01B 5/20; G01B 7/283; G01B 5/202; G01B 7/28; G01B 11/2416;  
(Continued)

(56) References Cited

U.S. PATENT DOCUMENTS 3,580,068 A   5/1971 Hoodwin  
7,963,160 B2 * 6/2011 Bisgaard ............. G01M 5/0058  
                                                    73/170.01  
2009/0107255 A1 * 4/2009 Jensen .................... F03D 13/20  
                                                    290/55

FOREIGN PATENT DOCUMENTS

CN      105738105 A  *  7/2016  
CN      106226075       7/2018  
(Continued)

OTHER PUBLICATIONS

International Search Report issued by the European Patent Office in International Application PCT/EP2021/050327 on Apr. 29, 2021.  
(Continued)

*Primary Examiner* — Andre J Allen  
(74) *Attorney, Agent, or Firm* — Henry M. Feiereisen LLC (57) ABSTRACT

A testing device includes a drive unit and an output unit, which are connected together via first and second gearboxes. The testing device is configured to adjustably tilt and/or adjustably displace at least one of the first and second gearboxes for at least partially simultaneous testing of the first and second gearboxes.

18 Claims, 5 Drawing Sheets

(58) Field of Classification Search
CPC ........ G01B 21/20; G01B 5/163; G01B 5/166; G01B 7/146; G01B 5/0002; G01B 5/008; G01B 11/245; G01B 11/30; G01B 3/48; G01B 5/012; G01B 5/14; G01B 5/146; G01B 5/242; G01B 9/08; G01B 11/14
USPC ......................................................... 73/162
See application file for complete search history.

(56) References Cited

FOREIGN PATENT DOCUMENTS

| | | | | | |
|---|---|---|---|---|---|
| CN | 113252343 | A | * | 8/2021 | |
| CN | 114739663 | A | * | 7/2022 | |
| DE | 102010053808 | | | 6/2012 | |
| DE | 102012021007 | | | 5/2013 | |
| DE | 102012021007 | A1 | * | 5/2013 | .......... G01M 13/028 |
| EP | 2 574 778 | | | 9/2015 | |
| EP | 3859297 | A1 | * | 8/2021 | .......... G01M 13/021 |

OTHER PUBLICATIONS

Clemson University: "Wind Turbine Test Beds", 2022.
https://w3.windmesse.de/windenergie/pm/27102-iwes-enercon-test-prüfstand-gondel-anlegenzertifizierung, Jul. 1, 2022.

* cited by examiner

TESTING DEVICE FOR GEAR MECHANISMS, TESTING METHOD, CONTROL UNIT AND COMPUTER PROGRAM PRODUCT

CROSS-REFERENCES TO RELATED APPLICATIONS

This application is the U.S. National Stage of International Application No. PCT/EP2021/050327, filed Jan. 11, 2021, which designated the United States and has been published as International Publication No. WO 2021/151635 A1 and which claims the priority of European Patent Application, Serial No. 20154842.7, filed Jan. 31, 2020, pursuant to 35 U.S.C. 119 (a)-(d).

BACKGROUND OF THE INVENTION

The invention relates to a testing device for gearboxes and to a corresponding testing method. The invention relates also to a control unit which is configured to carry out the testing method according to the invention on such a testing device. The invention relates further to a computer program product which can be stored and executed on the control unit for the purpose of carrying out the testing method.

The web page https://www.clemson.edu/cecas/departments/charleston/energy/wind-turbine-test-beds.html of Clemson University discloses datasheets for the test rigs used there for wind turbine nacelles or the drivetrains thereof. The test rigs are designed for maximum drive powers of 7.5 MW and 16 MW. On each test rig there is arranged at least one drive motor which is connected via a high-speed shaft to an accompanying gearbox. There emerges from the accompanying gearbox a low-speed shaft via which a rotor of a wind turbine nacelle to be tested is driven. The rotor of the wind turbine nacelle is connected by means of a substantially toroidal load application unit which is suitable for simulating operating states of the wind turbine.

The web page https://w3.windmesse.de/windenergie/pm/27102-iwes-enercon-test-prufstand-gondel-anlegenzertifizierung discloses a test rig for wind turbines of the Fraunhofer Institute for Wind Energy Systems, IWES for short, in Bremerhaven. The test rig has slowly rotating direct drives by means of which the wind turbines to be tested are driven.

Publication DE 10 2010 053 808 A1 discloses a wind turbine gearbox test rig on which two gearboxes can be mounted. The gearboxes are driven via a drive unit, which is connected by means of a torsion rod to a load unit. The load unit is connected to two torsion rods which can be clamped against each other.

Document EP 2 574 778 B1 discloses a testing device for a gearbox and an electromechanical energy converter, in which the gearbox to be tested is mounted in a gear system. Drive power is supplied to the gearbox to be tested via a plurality of motors and is also guided into the electromechanical energy converter.

In various fields of application, powerful gearboxes are used, the development process or certification process of which requires the corresponding gearboxes to be tested. There is therefore a need for a testing device for gearboxes which allows test runs to be carried out quickly, offers a high degree of flexibility and can be produced in a simple manner. The object underlying the invention is to provide a possibility for testing gearboxes which offers an improvement in at least one of the outlined aspects.

SUMMARY OF THE INVENTION

The object is achieved by the testing device for gearboxes according to the invention, which comprises a drive unit and an output unit. The drive unit provides a mechanical drive power with which the gearboxes to be tested can be driven. For this purpose, the drive unit can be in the form of an electric motor, for example. The output unit is configured to take up the mechanical drive power conducted by the gearboxes. For this purpose, the output unit can be in the form of a generator or a brake, for example. The drive unit and the output unit are connected together via a first and a second gearbox which are to be tested by means of the testing device. The connection via the first and second gearboxes conducts the mechanical drive power from the drive unit to the output unit. By adjusting the mechanical drive power, speeds present in the first and second gearboxes can be specified within the context of a test run. According to the invention, at least the first gearbox is configured to be adjustably tiltable and/or displaceable. The testing device is accordingly configured to adjustably tilt and/or displace at least the first gearbox when the first gearbox is connected to the testing device as intended. Tilting thereby takes place about at least one spatial axis, which can be oriented perpendicular to a main axis of rotation of the first gearbox or coincides with the main axis of rotation of the first gearbox. Displacement takes place translationally along at least one of the spatial axes. The tilting and/or displacement also induces a mechanical reaction at the second gearbox. The first gearbox and the second gearbox can thereby be tested at least partially simultaneously.

Testing the first and second gearboxes at least partially simultaneously makes it possible to accelerate the testing operation. In particular, the first and second gearboxes can be of different types, that is to say not structurally identical or mutually interchangeable. Of different types is thereby also to be understood as meaning first and second gearboxes that have different components in some places. They can be, for example, gearboxes with different bearings but an otherwise identical construction. Likewise, gearboxes in which components are produced in different production processes but which otherwise have the same construction can also be tested at least partially simultaneously. This allows different types, models or variants of gearboxes to be tested in a common test run, which reduces the number of test runs required, for example for a test program. The number of test runs required can thereby substantially be halved, which permits an economical testing operation overall.

In one embodiment of the claimed testing device, the tilting and/or displacement of the first gearbox can produce a mechanical reaction between the first and second gearboxes. The mechanical reaction can comprise a reaction force and/or a reaction torque. Real-life operation of the gearbox can thereby be simulated, in which the mechanical drive power is introduced with a deviation from an idealized main axis of rotation. In particular in the case of gearboxes which are to be used in wind turbines, a real-life operating state with changing wind conditions can thus be simulated. The mechanical reaction, which comprises the reaction force and/or the reaction torque, can thus purposively be specified and is suitable, as an operating condition specification, to be part of a test run which is to be carried out with the testing device. Overall, this allows a wide range of programs for testing the gearboxes to be specified, for example by a user, an algorithm or a table. In particular, it is thus possible to link together measured data obtained for the first and second gearboxes in the test run by means of a simple time stamp. Such linking ensures, in a simple manner, comparability of the two gearboxes under corresponding operating conditions. In this manner too, the time necessary for a testing program can be shortened overall.

Furthermore, the second gearbox can also be configured to be tiltable and/or displaceable. The tiltability or displaceability of the second gearbox can thereby correspond to the tiltability of the first gearbox. In particular, the testing device, analogously to the tiltability and/or displaceability of the first gearbox, is also configured to adjustably tilt and/or displace the second gearbox. The tiltability and/or displaceability of the second gearbox allows a wider range of stresses, and thus of reaction forces and/or reaction torques, to be induced in a test run. Likewise, the first and second gearboxes can be tilted and/or displaced simultaneously, and an excursion that is to be set can thus be split between multiple tilting and/or displacement movements. The flexibility of the claimed testing device is thereby increased further.

A further embodiment of the claimed testing device has at least one actuator which is configured to tilt and/or to displace at least the first gearbox. For this purpose, the actuator can be fixedly connected to the surrounding area, for example. Alternatively or additionally, the actuator can also be arranged between the first and second gearboxes and/or can be in the form of a rotating actuator. In particular, the actuator can be in the form of a hydraulic cylinder, servo motor and/or spindle drive. Actuators, in particular hydraulic cylinders, are available in different structural forms, which offer a high actuating force and at the same time high actuating precision. Likewise, actuating positions of the actuator that have been reached can be maintained precisely. In particular, exact performance of the tilting and/or displacement in the test run is possible, which in turn leads to precise measured data. Alternatively or additionally, the first gearbox can also be tiltable and/or displaceable via multiple actuators, whereby the outlined advantages are achieved to an increased extent. Further alternatively or additionally, the second gearbox can also be configured to be tiltable and/or displaceable via at least one actuator. In this manner too, the described advantages of precise execution of a test run are achieved to an increased extent. Actuators such as, for example, hydraulic cylinders are likewise available in a large number of sizes. A technically complex toroidal or crown-shaped load application unit is not necessary in the claimed testing unit. A repair to such actuators can likewise be carried out in a simple manner, which permits particularly cost-efficient maintenance. Overall, the claimed solution thus offers a particularly high degree of economy.

In addition, the first gearbox can be arranged in the claimed testing device on a tiltable carrier frame. Such a carrier frame can be arranged, for example, on articulated supports and/or at least one actuator. By actuation of the at least one actuator, the spatial position of the carrier frame can be changed. The first gearbox can be fastened to a test mount on the carrier frame. There is thus a standardized test setup for a plurality of types of gearbox, in which, in a simple manner, by setting desired translational displacements and/or tilt angles, reaction forces and/or reaction torques can be set with substantially identical control commands also standardized test runs. Alternatively or additionally, the second gearbox can also be arranged on such a carrier frame. The use of carrier frames offers a standardized test setup overall on the claimed testing device, which is suitable for a large number of different types of gearbox and permits a simplified execution of test runs.

In a further embodiment of the claimed testing device, the first and second gearboxes are connected together in opposite transmission directions. Such an arrangement is also called a back-to-back arrangement. As a result, when seen along a flow of the mechanical drive power, first an increase in the current speed and then a reduction in the current speed occurs in a gearbox. Alternatively, a reverse arrangement of the first and second gearboxes in respect of the increase and reduction Is also possible. The mechanical drive power is thereby supplied to the output unit, allowing for mechanical losses, with a speed which is similar to or identical with or different from that at the output of the drive unit. The drive unit and the output unit, for example an electric motor and a generator, can thus be configured, for example, as structurally identical electromechanical machines operating in opposite directions. Maintenance of the claimed testing device is thereby simplified, which in turn permits particularly economical operation. Furthermore, such an arrangement allows substantially mirror-inverted reaction forces and/or reaction torques to be induced on tilting and/or displacement at the first and second gearboxes. This ensures comparability of the measured data at the first and second gearboxes in a test run. Consequently, it is ensured that the first and second gearboxes can optimally be fully loaded in a test run. Overall, the advantages of the claimed solution are thus realized to an increased extent.

The at least one actuator can further be fastened to the subfloor. A stable connection with the surrounding area is thereby ensured, which in turn allows test runs permanently to be carried out precisely. In particular, the at least one actuator can be arranged beneath the at least first gearbox. For example, a plurality of actuators can be arranged on a foundation, which is accommodated beneath a floor plane. The floor plane is here to be understood as meaning a floor level of the surrounding area, for example a hall floor. The foundation can accordingly be located substantially in a cellar-like cavity. The at least one actuator is thereby arranged at least partially beneath the floor plane. The actuators can thus be positioned on a reduced foundation area, which in turn requires a reduced outlay in terms of construction. Furthermore, the testing device has a reduced vertical dimension. The testing device can thus be set up in a low-rise hall, which also permits a lower crane track in the hall. The claimed testing device also offers improved accessibility, which permits easier maintenance. Likewise, a foundation beneath the floor plane in conjunction with a wall can serve as a trough. Such a trough prevents hydraulic fluid from entering the surrounding area, for example in the event of a leakage. The claimed testing arrangement is thus space-saving, can be produced and maintained in a cost-efficient manner and offers a high degree of protection against environmental damage.

According to a further embodiment of the claimed testing device, the first or second gearbox can be connected directly in a torque-transmitting manner to the drive unit or the output unit. In the case of such a direct connection, the mechanical drive power generated by the drive unit is supplied to the first or second gearbox without any change in the current speed or the current torque. Correspondingly, there is also no further change in the mechanical drive power in respect of speed or torque between the gearboxes and the output unit. An accompanying gearbox or a so-called direct-drive unit are therefore unnecessary in the claimed testing device. In this manner too, the advantages outlined above of the claimed testing device are increased further.

Furthermore, the first and/or second gearbox can be in the form of a wind turbine gearbox. In the prototype testing or certification of wind turbine gearboxes, different wind conditions are to be tested in test runs, for example changing wind directions and wind strengths. In order to simulate such wind conditions, the mechanical drive power is to be introduced into the gearbox with a deviation from an idealized main axis of rotation. For example, the mechanical drive power is to be subjected to a radial transverse force which acts on an input shaft of the corresponding gearbox. Such a radial transverse force can occur at a rotor of a wind turbine as a result of wind loads, which in turn act on a rotor shaft which is connected to the input shaft of the gearbox. The claimed testing device offers a simple and economical possibility for producing corresponding reaction forces and/or reaction torques, which simulate such wind conditions, by tilting and/or displacing the at least first gearbox. The technical advantages of the claimed testing device can be achieved to a particular degree when a wind turbine gearbox is tested using the device. Likewise, a wide range of use conditions of gearboxes for industrial applications can be simulated by means of the claimed testing device. By testing two gearboxes at least partially simultaneously, it can thus quickly be determined which from a selection of gearbox models is most suitable for a new intended purpose.

In addition, there can also be associated with the claimed testing device a control unit which is configured to tilt at least the first gearbox. The control unit is adapted to output control commands to components of the testing device, for example to actuators, and thus produce the reaction forces and/or reaction torques by which an operating condition specification is implemented at least at the first gearbox. Changing wind conditions, for example, can thereby be simulated. In particular, reaction forces and/or reaction torques relative to multiple spatial axes can thus be specified in a simple manner. The control unit can additionally be configured to control further components of the testing device, for example by specifying a speed of the drive unit. Likewise, further parameters, such as, for example, pressures, temperatures or speeds, which may be relevant for a test run can be set by means of the control unit. The control unit can be associated directly with the testing device, for example as an internal control unit. Alternatively, the control unit can also be in the form of a higher-level control unit, which is coupled with the testing device via a data link. Further alternatively, the control unit can also be in the form of a combination of an internal and a higher-level control unit. A control unit allows a user to set an operating condition specification for a test run in a simple manner, for example by a user input, an algorithm or by means of a table, which reproduce a desired test run. Such control units thus provide the claimed testing device with improved ease of use and a high degree of flexibility during operation.

In addition, the claimed testing device can be provided with a center bearing by means of which the first and second gearboxes can be connected together. For this purpose, the first and second gearboxes are arranged on opposite sides of the center bearing and are releasably connected thereto. The center bearing Is configured to absorb radial forces acting on at least one shaft which connects the first and second gearboxes in a torque-transmitting manner. The center bearing can be connected directly to the surrounding area, that is to say the subfloor or a foundation. Alternatively, the center bearing can also be connected to the surrounding area via an actuator. The center bearing serves to introduce the absorbed radial forces into the surrounding area. Alternatively, a test force can also be exerted by the actuator on the center bearing, and thus also on the first and second gearboxes. This allows complex dynamic operating conditions, for example changing wind conditions, to be simulated in a variety of ways.

The described object is also achieved by a method according to the invention for testing gearboxes. The method according to the invention comprises a first step, in which a first and a second gearbox are provided in a testing device. In a subsequent second step, a drive unit which is associated with the testing device is activated. By means of the drive unit, mechanical drive power is thus provided for the first and second gearboxes, as a result of which operation of the gearbox which is to be determined within the context of the testing is established. Correspondingly, a loading torque is provided by the output unit. In a third step of the method, at least the first gearbox is adjustably tilted and/or displaced. A reaction force and/or a reaction torque is thereby induced between the first gearbox and the second gearbox. According to the invention, the reaction force and/or the reaction torque correspond to a test force or a test torque. Where a center bearing is present, also in the form of a radial force. The test force(s) or the test torque(s) form part of an operating condition specification, which forms part of an intended test run. It is thereby possible to simulate, for example, changing wind conditions at a wind turbine, and thus the changing operating conditions of a wind turbine gearbox. After the adjustable tilting and/or displacement of at least the first gearbox, measured data which describe a load state of the gearbox that is to be determined can be recorded at the first and/or second gearbox by means of at least one sensor.

In one embodiment of the claimed method, testing of the first and second gearboxes can take place at least partially simultaneously. The mechanical reactions, which comprise the reaction force and/or the reaction torque, are substantially identical (mirror-inverted) for the first and second gearboxes, so that the same operating conditions are present for both gearboxes at least partially simultaneously in the same test run. As a result, it is possible, for example by means of a time stamp, to compare measured data relating to the first gearbox directly with measured data relating to the second gearbox. In particular, the first and second gearboxes can be of different types. The claimed method offers increased efficiency because, compared to known solutions, two gearboxes of different types can now be tested at the same time. Alternatively, two identical gearboxes can also be tested simultaneously. By the use of two identical gearboxes, at least two corresponding items of measured data are present for each state, so that, by statistical evaluation thereof, for example by averaging, a result of a test run is more meaningful. The duration of a testing program, for example a certification test, can thereby be reduced.

The claimed method can further be carried out by means of a testing device according to one of the embodiments outlined above. The described testing devices allow the claimed method to be carried out quickly and economically in a particularly simple, low-maintenance and precise manner.

The object outlined above is likewise achieved by a control unit according to the invention. The control unit comprises a memory and a computer unit and is suitable for receiving user inputs and outputting control commands to at least one actuator of a testing device. The control unit can be associated directly with the testing device in the form of an internal control unit, or it can be in the form of a higher-level control unit which is coupled with the testing device via a data link. An internal control unit can be in the form of, for example, a programmable logic controller, PLC for short. A higher-level control unit can be in the form of, for example, a master computer, web server, hand-held device or computer cloud. In addition, the control unit can also be in the form of a combination of an internal control unit and a higher-level control unit. The control unit is configured according to the invention to carry out a method according to at least one of the above-described embodiments. For this purpose, a computer program product can be stored in an executable manner in the control unit. The control unit according to the invention can further be connected to a testing device according to one of the embodiments outlined above.

The described object is likewise achieved by a computer program product according to the invention. The computer program product is configured to specify and set test forces and/or test torques for the testing of gearboxes in a test run. The computer program product is configured to output control commands to at least one actuator which forms part of a testing device. The computer program product can be configured as software, in the form of a chip, that is to say hard-wired, or an FPGA circuit, or a combination thereof. Furthermore, the computer program product can be monolithic or in the form of a system of at least two subprograms which can be executed on separate hardware and in communication with one another realize the operation of the computer program product. According to the Invention, the computer program product is configured to be executed on a control unit according to the invention. By means of the computer program product, in conjunction with a control unit, a testing device according to one of the above-described embodiments can be operated or one of the above-described methods can be implemented. The computer program product according to the invention offers the possibility of testing two gearboxes together in a simple manner and offers a high degree of configurability. In particular, operating condition specifications desired by a user input, which can automatically be converted by the computer program product into corresponding reaction forces and/or reaction torques, can be set. Accordingly, the claimed testing device can also be controlled in operation by the claimed computer program product. In addition, the computer program product can also be configured to store and evaluate measured data received from at least one sensor which is mounted on the first or second gearbox. In particular, a simulation image of the first and/or second gearbox and/or of a wind turbine and/or of an industrial application can also be stored in the computer program product according to the Invention. Such simulation images are also known as digital twins. The operation and use of a corresponding testing device is thus simplified and the testing operation is accelerated.

BRIEF DESCRIPTION OF THE DRAWING

The invention will be described in the following text with reference to figures of individual embodiments. The features of the figures can thereby readily be combined with one another. The figures are to be read in mutual complementarity insofar as identical reference numerals have the same technical meaning. Specifically.

DETAILED DESCRIPTION OF PREFERRED EMBODIMENTS

Figure 1:
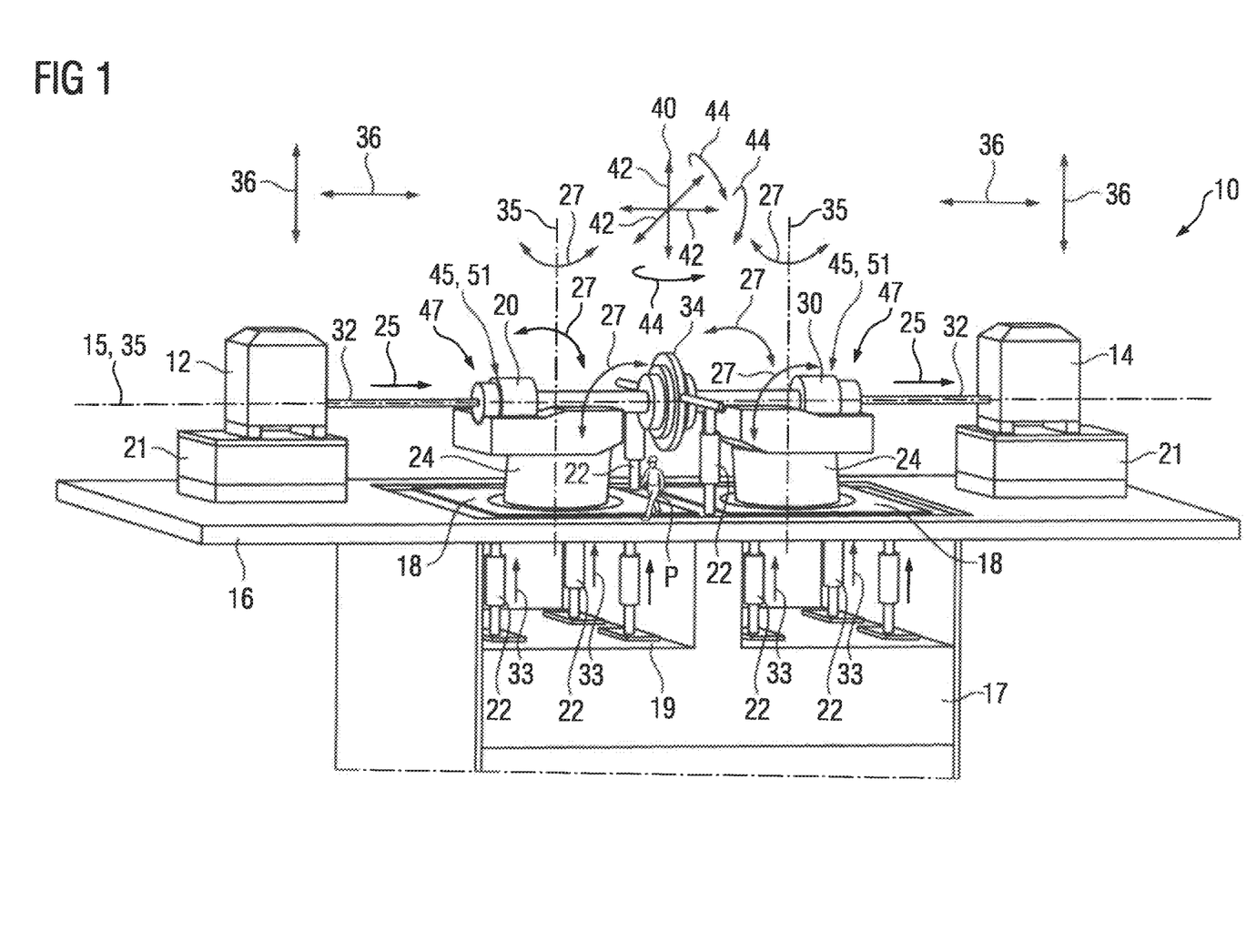
FIG. 1 is a sectional view of a first embodiment of the claimed testing device.

FIG. 1 shows, schematically, a first embodiment of a claimed testing device 10 in a sectional view. For a better overview, a person P is depicted as a standard of comparison. The testing device 10 comprises a drive unit 12, which is in the form of an electric motor, and an output unit 14, which is in the form of a generator. The drive unit 12 and the output unit 14 are each arranged on a base 21. Between the drive unit 12 and the output unit 14 there are arranged first and second gearboxes 20, 30, which are in the form of wind turbine gearboxes 47. The first and second gearboxes 20, 30 are of different types and are to be tested on the testing device 10. A mechanical drive power 25 can be provided by the drive unit 12 and is delivered by the first and second gearboxes 20, 30 to the output unit 14. The drive power 25 is generated about a main axis of rotation 15 of the first and second gearboxes 20, 30, which in the context of the testing device 10 represents a spatial axis 35. Operation of the drive unit 12 can at least be assisted by means of power generation by the output unit 14 in the form of a generator. For transmitting the mechanical drive power 25, the drive unit 12 is connected directly in a torque-transmitting manner to the first gearbox 20 on the output side 29 thereof via a power shaft 32. In an analogous manner, the second gearbox 30 is connected directly in a torque-transmitting manner to the output unit 14 on the output side 29 thereof via a power shaft 32. The first and second gearboxes 20, 30 are connected together via a center bearing 34. The center bearing 34 is configured to connect shafts of the first and second gearboxes 20, 30 in a torque-transmitting manner and to absorb radial forces, relative to the main axis of rotation 15. The center bearing 34 is further connected via an actuator to the surrounding area, that is to say the floor plane 16. By means of the actuator 22, radial forces can be introduced into the first and second gearboxes 20, 30. Along a flow of the mechanical drive power 25, which is illustrated by an arrow in FIG. 1, a reduction in a speed takes place in the first gearbox 20 and an increase in a speed takes place in the second gearbox. The first and second gearboxes 20, 30 are each connected by their drive side 26 to the connecting flange 34, and thus in opposite transmission directions, that is to say the direction of the change in speed.

The first and second gearboxes 20, 30 are each fastened to a test mount 24, each of which is connected to a carrier frame 18 which is located substantially at ground level on a floor plane 16. The carrier frame 18 is configured to be tiltable and/or displaceable, so that a mechanical reaction can purposively be induced in the region of the center bearing 34. For this purpose, the carrier frames 18 are each fastened to actuators 22, which are in the form of hydraulic cylinders. The actuators 22 are each configured to exert an actuator force 33 and thus to induce tilting 27 and/or displacement 36 of the first and/or second gearbox 20, 30. Such tilting 27 and/or displacement 36 can take place about multiple spatial axes 35, as is shown in FIG. 1. The mechanical reaction 40 comprises, depending on the orientation of the tilting 27 or displacement 36, reaction forces 42 in the region of the center bearing 34 which are oriented in different spatial directions. Correspondingly, the mechanical reaction 40 also comprises reaction torques 44, which have different orientations corresponding to the reaction forces 42. Actuation of the actuators 22 is adjustable, so that tilting 27 and/or displacement 36 of the first and/or second gearbox 20, 30 can purposively be induced. The mechanical reaction 40 so induced corresponds to a desired operating state of the first and second gearboxes 20, 30 under which they are to be tested. Accordingly, reaction forces 42 and/or reaction torques 44 are present in the first and second gearboxes 20, 30. In particular, tilting 27 and/or displacement 36 of the first and/or second gearbox 20, 30 causes a mirror-inverted corresponding stress in both gearboxes 20, 30. The mechanical reaction 40, that is to say the corresponding reaction forces 42 and reaction torques 44, can be detected via sensors 45 which are arranged in each of the first and second gearboxes 20, 30. For this purpose, the sensors 45 are mounted at measuring points 51 in the first and second gearboxes 20, 30. The results of the test so achieved for the first and second gearboxes 20, 30 are therefore directly comparable with one another.

In the testing device 10, the actuators 22 are arranged on a foundation 17, which is located beneath the floor plane 16. The foundation 17 serves as a subfloor 19 and is located beneath the carrier frame 18 with the test mounts 24 for the gearboxes 20, 30. The actuators 22 are thereby positioned substantially in a cellar-like cavity. The actuators 22 can be positioned close to one another, whereby the foundation 17 has a reduced size. Sufficiently loadable foundations 17 and also sufficiently loadable bases 21 are complex and cost-intensive. The testing device 10 requires smaller foundations 17 and bases 21 than solutions known from the prior art and can therefore be produced with a reduced outlay in terms of construction.

Figure 2:
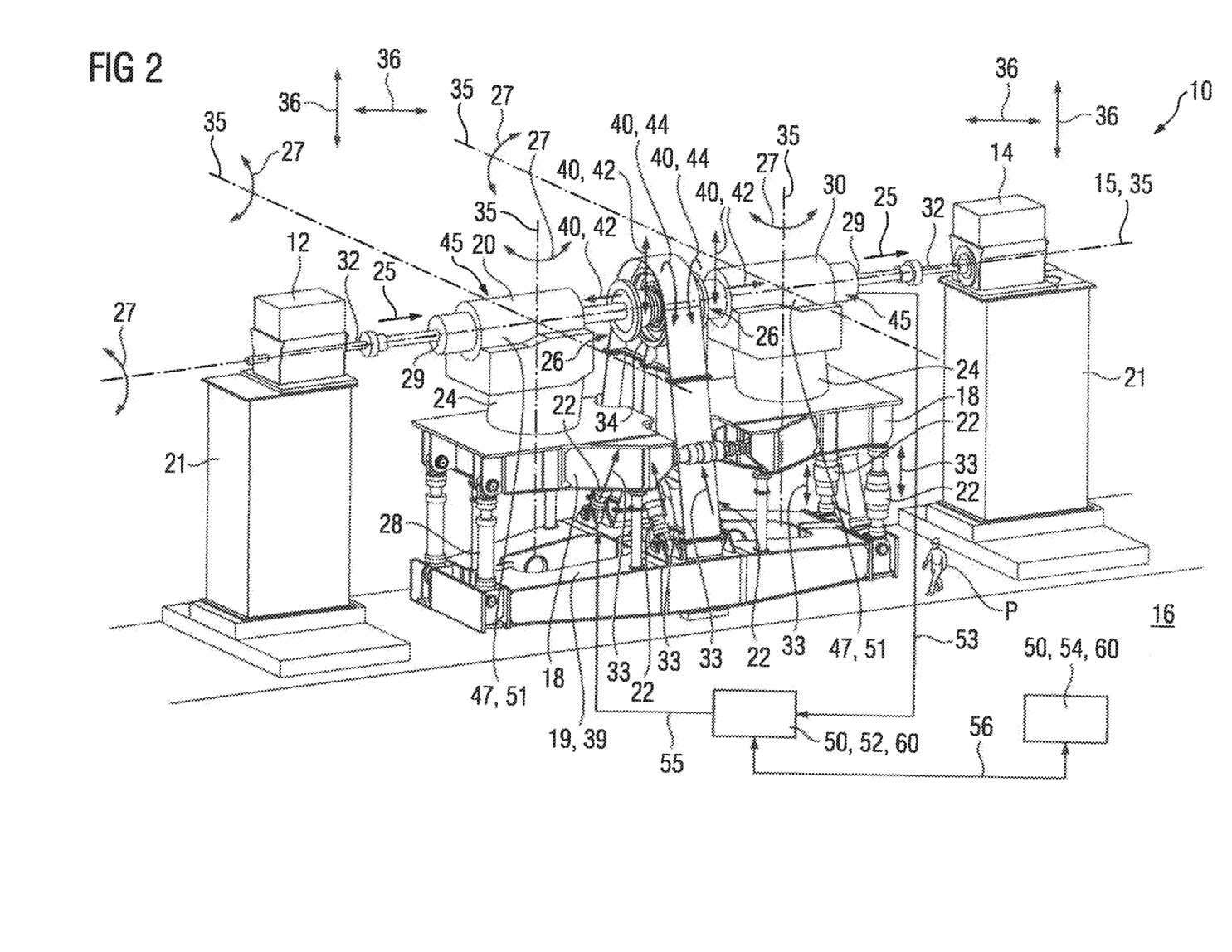
FIG. 2 is a partially cutaway oblique view of a second embodiment of the claimed testing device.

FIG. 2 shows, schematically, a second embodiment of the claimed testing device 10 in a partially cutaway oblique view. For a better overview, a person P standing on a floor plane 16 is also depicted in FIG. 2. The testing device 10 comprises a drive unit 12 and an output unit 14, which are connected together in a torque-transmitting manner via first and second gearboxes 20, 30. The gearboxes 20, 30 are in the form of wind turbine gearboxes 47 and are of different types. The first and second gearboxes 20, 30 are to be tested in the testing device 10 at least partially simultaneously. The drive unit 12 is arranged on a base 21 and is in the form of an electric motor by means of which mechanical drive power 25 is provided. The mechanical drive power 25, the direction of flow of which is illustrated by the arrow 25, is transmitted via a power shaft 32 directly to an output side 29 of the first gearbox 20. The mechanical drive power 25 has a torque which is oriented about a main axis of rotation 15 of the gearboxes 20, 30 and in the context of the testing device 10 corresponds to a spatial axis 35. The first and second gearboxes 20, 30 are connected via their respective drive sides 26 to the center bearing 34. An Increase in the speed takes place in the first gearbox 20, and a reduction in the speed takes place in the second gearbox 30. Along the direction of flow of the mechanical drive power 25, the first and second gearboxes 20, 30 are thus connected together in opposite transmission directions. This arrangement is also called a back-to-back arrangement. Correspondingly, the second gearbox 30 is also connected directly on its output side 29 via a power shaft 32 to the output unit 14, which is in the form of a generator. The drive unit 12 can be operated at least partially by the electrical energy obtained in the output unit 14. The output unit 14, correspondingly to the drive unit 12, is also positioned on a base 21.

The gearboxes 20, 30 are fastened to test mounts 24, which are each arranged on a carrier frame 18. The carrier frames 18 are in turn movably accommodated on a plurality of actuators 22 and supports 28. The actuators 22, which are in the form of hydraulic cylinders, are suitable for exerting an actuator force 33 by means of which the carrier frames 18 can be tilted and/or displaced. The actuators 22 are arranged on a base frame 39, which serves as the subfloor 19 for the actuators 22. Tilting 27 and/or displacement 36 of the first and/or second gearbox 20, 30 about or along a spatial axis 35 can thus be effected by corresponding actuation of the actuators 22. As a result, a mechanical reaction 40, which in each case comprises reaction forces 42 and reaction torques 44, is correspondingly induced in a mirror-inverted manner in the first and second gearboxes 20, 30. The reaction forces 42 and reaction torques 44 in the first and second gearboxes 20, 30 are thus simultaneously substantially equal in a mirror-inverted manner. The first and second gearboxes are therefore subjected to the same mechanical stress at the same time. The corresponding states which are thus present simultaneously therefore allow the testing of the first gearbox to be compared directly with the testing of the second gearbox. For this purpose, the testing device as a whole and each of the gearboxes 20, 30 is equipped with sensors 45, which are arranged at measuring points 51 (not shown in greater detail) in the respective gearbox 20, 30. The sensors 45 are configured to transmit measured data 53 to a control unit 50. The control unit 50 comprises an internal control unit 52, which is associated directly with the testing device 10. The control unit 50 is also configured to output control commands 55 to at least one of the actuators 22. The control unit 50 also comprises a higher-level control unit 54, which is connected to the internal control unit 52 via a data link 56. The higher-level control unit 54 can be in the form of a computer cloud or master computer, for example, which cooperates with the internal control unit 52 for a testing operation. The internal control unit 52 and the higher-level control unit 54 each have a memory for storing and executing a computer program product 60 via which the testing device 10 can be operated. By means of the computer program product 60, control commands 55 for the actuators 22 can be specified and/or measured data 53 from the sensors 45 can be stored and/or processed.

Figure 3:
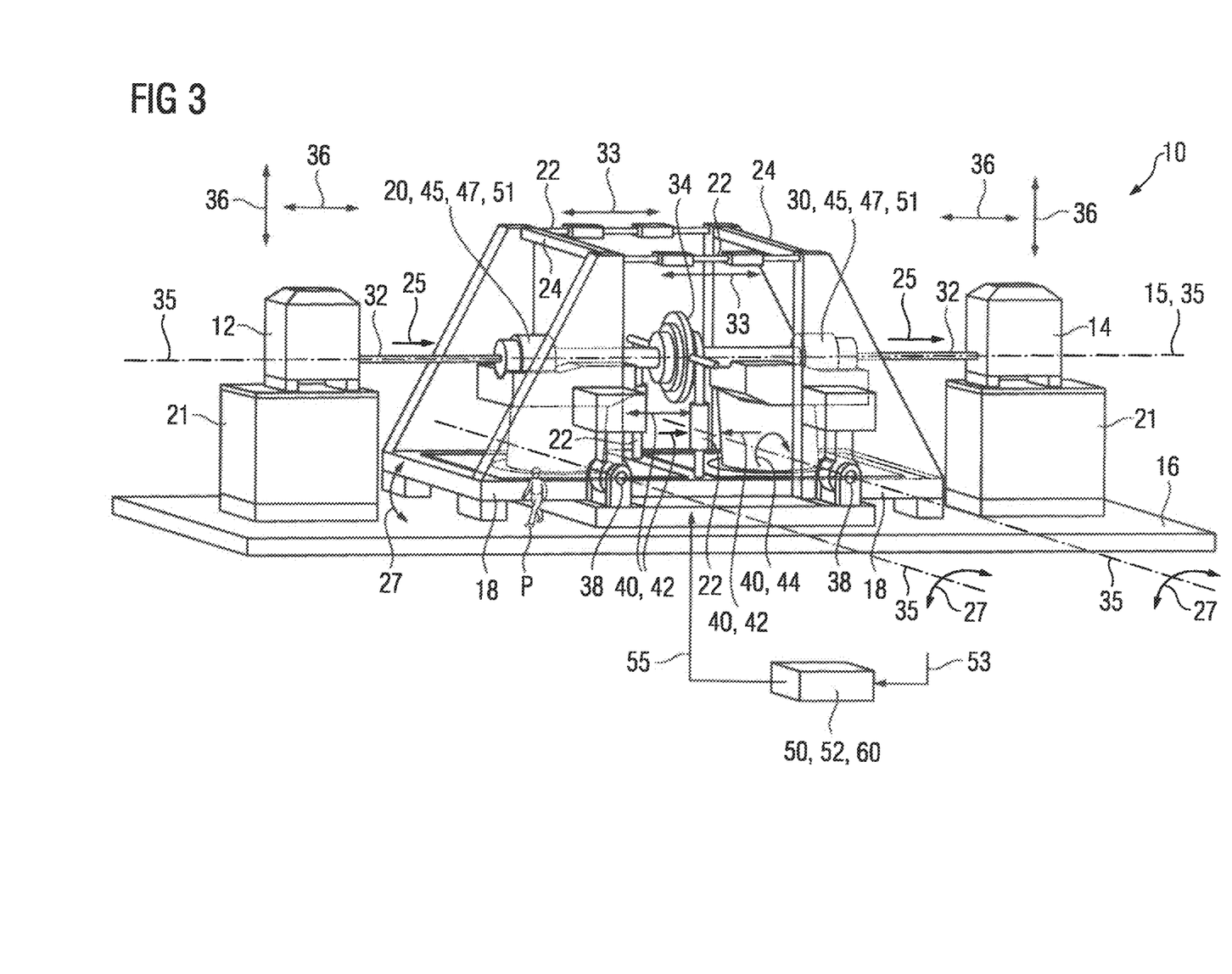
FIG. 3 is an oblique view of a third embodiment of the claimed testing device.

FIG. 3 shows, schematically, a third embodiment of the claimed testing device 10. For comparison purposes, a person P is also shown in FIG. 3. The testing device 10 comprises a drive unit 12 and an output unit 14. By means of the drive unit 12, which is in the form of an electric motor, mechanical drive power 25 is provided and is supplied via a power shaft 32 to a first gearbox 20. The first gearbox 20 is connected via a center bearing 34 to a second gearbox 30, via which, by means of a power shaft 32, the mechanical drive power 25 is supplied directly to the output unit 14, which is in the form of a generator. The center bearing 34 is connected to the floor plane 16 via at least one actuator 22 or via a passive connection. Radial forces, relative to the main axis of rotation 15, can thereby be exerted at the center bearing 36 on the first and second gearboxes 20, 30. The first and second gearboxes 20, 30 are each in the form of a wind turbine gearbox 47. In the testing device 10, the mechanical drive power 25 is transported in the direction of the depicted arrow along a main axis of rotation 15 of the gearboxes 20, 30, which in the testing device 10 is to be interpreted as a spatial axis 35. The drive unit 12 and the output unit 14 are each positioned on a base 21, which stands on a floor plane 16. The gearboxes 20, 30 arranged therebetween are each fastened in a test mount 24, which can be tilted and displaced along or about multiple spatial axes 35. Each test mount 24 is fixedly connected to a carrier frame 18, which can be tilted with the test mount 24 about an articulation 38. Tilting 27 and/or displacement 36 of the first and/or second gearbox 20, 30 can be achieved via actuators 22, which connect together the test mounts 24 of the first and second gearboxes 20, 30. The actuators 22 are in the form of hydraulic cylinders and each are suitable for exerting an actuator force 33. By tilting 27 and/or displacement 36 of the first and/or second gearbox 20, 30, a mechanical reaction 40 which comprises reaction forces 42 and reaction torques 44 can be induced in the first and second gearboxes 20, 30 in the region of the center bearing 34. The mechanical reaction 40 is also determined by the radial forces exerted via the center bearing 36. The reaction forces 42 and reaction torques 44 in the first and second gearboxes 20, 30 correspond in a mirror-inverted manner. The mechanical reaction 40 can thus purposively be set in both gearboxes 20, 30, and a desired operating state of the gearboxes 20, 30 can thus be simulated in a test run. The test superstructures Including the gearboxes 20, 30 are equipped with sensors 45, which are positioned at measuring points 51 (not shown in greater detail) in or on the gearboxes 20, 30. By means of the sensors 45, measured data 53 which can be received by a control unit 50 can be generated. The control unit 50 comprises an internal control unit 52, which is associated directly with the testing device 10. The control unit 50 has a memory and is equipped with a computer program product 60 which is configured to store and/or process the measured data 53 from the sensors 45. The computer program product 60 is also configured to output control commands 55 for actuation of the actuators 22. The first and second gearboxes 20, 30 can thereby be tested at least partially simultaneously, and measured data 53 generated at the same time can be compared directly with one another. Overall, this allows test runs for directly comparing the gearboxes 20, 30 to be carried out particularly quickly and efficiently.

Figure 4:
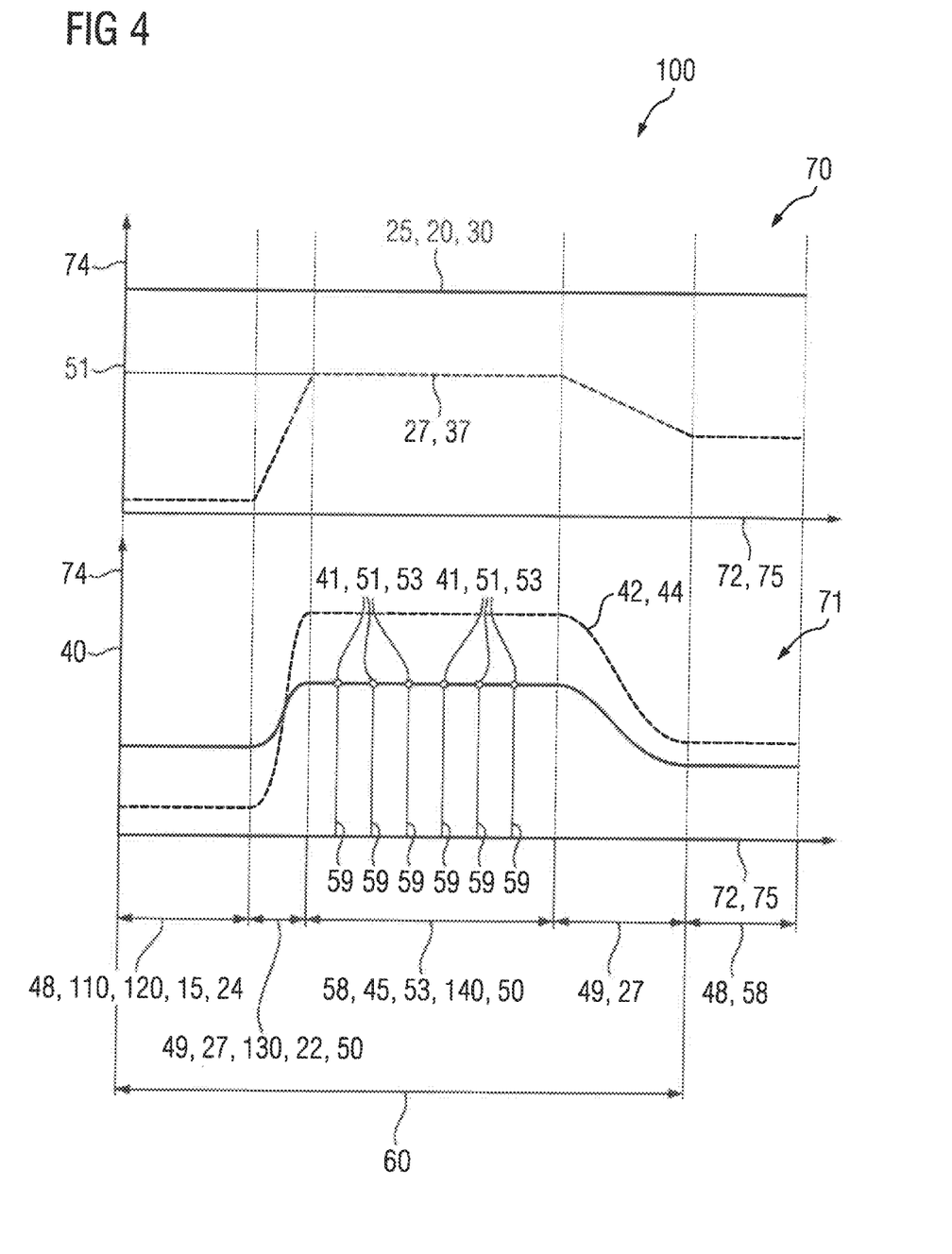
FIG. 4 shows, schematically, the execution of an embodiment of a claimed testing method.

FIG. 4 shows, schematically, the execution of an embodiment of the claimed method 100 for testing gearboxes 20, 30 with a testing device 10. FIG. 4 assumes that first and second steps 110, 120, in which the gearboxes 20, 30 are mounted in the testing device 10 and the testing device 10 is activated, have been carried out. In a first diagram 70, the execution of a test run 75 is depicted along a horizontal time axis 72. The first diagram 70 also has a vertical value axis 74. During the test run 75, a mechanical drive power 25 with which the gearboxes 20, 30 are driven remains constant. In the second method step 120, steady-state operation 48 is established, in which the gearboxes 20, 30 are aligned, that is to say their main axes of rotation 15 are in alignment. Accordingly, for the first and/or second gearbox 20, 30 according to the first diagram 70, tilting 27 by a tilt angle 37 of zero is present. In the meantime, a mechanical reaction 40 occurs at the first and second gearboxes 20, 30, as is shown on a value axis 40 in a second diagram 71. The embodiment according to FIG. 4 assumes that only tilting 27, which induces mechanical reactions 40, is present, but not displacement 36, as outlined in FIG. 1 to FIG. 3. The mechanical reaction 40 comprises at least one reaction force 42 and at least one reaction torque 44, which are substantially constant during steady-state operation 48. The at least one reaction force 42 and the at least one reaction torque 44 are obtained substantially as supporting reactions of the gearboxes 20, 30 in the respective test mounts 24.

The steady-state operation 48 in the second step 120 is followed in a third step 130 by a transitional operation 49, in which at least the tilt angle 37 is increased. In the third step 130, at least one actuator 22 of the testing device 10 is actuated via a control unit 50, whereby tilting 27 of the first and/or second gearbox 20, 30 occurs. As a result of this tilting 27, the at least one reaction torque 44 and the at least one reaction force 42 increase and, in a fourth step 140, reach a substantially constant value. In the third step 130, a desired operating state, which is to be measured within the context of the test run, is reached as a result of the tilting 27. A measuring operation 58 takes place in the third step 130, in which measured data 53 are generated by means of sensors 45 which are mounted at measuring points 51 in the gearboxes 20, 30, on an actuator 22, a test mount 24 and/or a carrier frame 18. In the second diagram 71, the measured data 53 are shown by way of example as measuring points 41 which are to be transmitted to a control unit 50 of the testing device 10. Each of the measuring points 41 has a definite position on the time axis 72, which is depicted as a time stamp 59. By means of the time stamp 59, measured data 53 for the first and second gearboxes 20, 30, that is to say the operating state present at that time, can be compared directly with one another.

The fourth step 140 is followed by a further transitional operation 49, in which the tilt angle 37 is reduced. Accordingly, the at least one reaction force 42 and the at least one reaction torque 44 occur to a reduced extent. This is followed by a further steady-state operation 48, which can also be used as a measuring operation 58. Multiple passes through individual or all the outlined steps 110, 120, 130, 140 can be combined to form a test run 75 of increased complexity. The control unit 50 is suitable for specifying the actuation of actuators 22 by means of control commands 55 and/or for storing and/or evaluating the measured data 53 from the test run 75.

Figure 5:
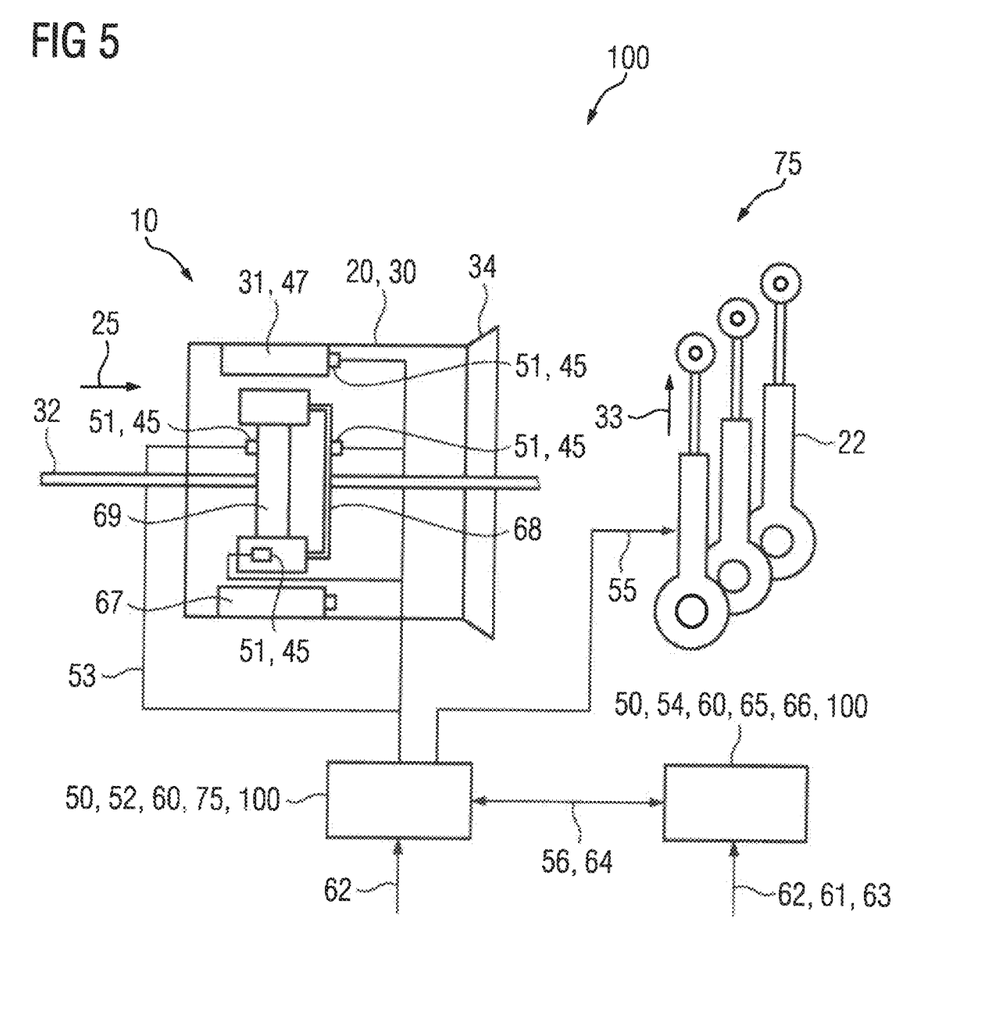
FIG. 5 shows, schematically, a detail of a fourth embodiment of the claimed testing device.

FIG. 5 shows, schematically, a detail of a fourth embodiment of the claimed testing device 10. FIG. 5 shows one of the two gearboxes 20, 30 which are to be tested by means of the testing device 10. The gearbox 20, 30 is in the form of a planetary gearbox 31, in particular in the form of a wind turbine gearbox 47. A ring gear 67, a planet carrier 68 and a sun gear 69 are each provided with a sensor 45. The sensors 45 are configured to detect an expansion, a force, a temperature and/or a vibration and are each arranged at a measuring point 51. A mechanical drive power 25 is supplied via a power shaft 32 which is coupled in a torque-transmitting manner with the sun gear 69. The gearbox 20, 30 can further be connected via a center bearing 34 to a further gearbox (not shown). Each of the sensors 45 is coupled for the transmission of measured data 53 with an internal control unit 52, which forms part of a control unit 50. The internal control unit 52 is suitable for receiving a user input 62 by means of which a test run 75 for the testing device 10 can be set in a computer program product 60, which is stored in an executable manner in the control unit 50. By means of the computer program product 60, the method 100 described in FIG. 4, for example, can thus be carried out. The internal control unit 52 and the computer program product 60 are further configured to output to at least one actuator 22 control commands 55 by means of which an actuator force 33 to be exerted can be specified. A desired test run 75 can thereby be set.

Furthermore, the internal control unit 52 is coupled with a higher-level control unit 54 via a data link 56. The data link 56 is in the form of an internet connection 64, and the higher-level control unit 54 is in the form of a computer cloud 65. A so-called digital twin 66, that is to say a simulation image of at least one gearbox 20, 30 is stored in the computer cloud 65 in association with the testing device 10. There is also stored on the higher-level control unit 54 a computer program product 60 which cooperates with the computer program product 60 in the internal control unit 52 via the data link 56 and implements, for example, the method 100 according to FIG. 4. The higher-level control unit 54 is also configured to receive a user input 62 by means of which a test run 75 is to be set. For example, a test force 61 and/or a test torque 63 which is to be implemented at the respective gearbox 20, 30 by the reaction force 42 or the reaction torque 44 can be specified by the user input 62.

The invention claimed is:

1. A testing device for gearboxes, comprising:
a drive unit; and
an output unit, the drive unit and the output unit being connected together via first and second gearboxes,
said testing device being configured to adjustably tilt and/or adjustably displace at least one of the first and second gearboxes and configured to at least partially simultaneously test the first and second gearboxes.

2. The testing device of claim 1, wherein a reaction force and/or a reaction torque is produced between the first and second gearboxes as the testing device tilts and/or displaces the first and second gearboxes.

3. The testing device of claim 1, wherein the testing device is configured to adjustably tilt and/or adjustably displace the other one of the first and second gearboxes.

4. The testing device of claim 1, further comprising an actuator configured to tilt and/or displace the one of the first and second gearboxes.

5. The testing device of claim 4, wherein the actuator is fastened to a subfloor.

6. The testing device of claim 4, wherein the actuator is arranged beneath a floor plane.

7. The testing device of claim 1, further comprising a tiltable and/or displaceable carrier frame, said one of the first and second gearboxes being fastened to the carrier frame.

8. The testing device of claim 1, wherein the first and second gearboxes are connected together in opposing transmission directions.

9. The testing device of claim 1, wherein the first gearbox or the second gearbox is connected directly in a torque-transmitting manner to the drive unit or the output unit.

10. The testing device of claim 1, wherein the at least one of the first and second gearboxes is embodied in a form of a wind turbine gearbox.

11. The testing device of claim 1, further comprising a control unit configured set a tilting of the one of the first and second gearboxes.

12. The testing device of claim 1, wherein the first gearbox is formed as a planetary gearbox and the second gearbox is formed as a planetary gearbox, wherein a ring gear, a planet carrier, and a sun gear of each of the gearboxes are each provided with a sensor, and wherein a center bearing connects the first and second gearboxes to one another and wherein the first and second gearboxes are each fastened on a test mount with each test mount connected to a support frame located at ground level on a floor plane and carrier frames each fastened to actuators, and wherein, in order to test the first and second gearbox at least partially simultaneously, the actuators exert an actuator force in order to bring about tilting and/or displacement about a plurality of spatial axes as a mechanical reaction of at least the first gearbox, wherein the mechanical reaction, comprising reaction forces and reaction torques in a region of the center bearing, are acquired by the sensors.

13. A testing method for gearboxes, comprising:
connecting a drive unit and an output unit of a testing device by first and second gearboxes;
activating the drive unit; and
adjustably tilting and/or displacing at least one of the first and second gearboxes in order to produce a reaction force and/or a reaction torque between the first and second gearboxes,
wherein the reaction force and/or the reaction torque corresponds to a test force or a test torque which form part of an intended test run; and
wherein testing of the first and second gearboxes takes place at least partially simultaneously.

14. The method of claim 13, further comprising adjustably tilting and/or adjustably displacing the other one of the first and second gearboxes.

15. The method of claim 13, further comprising connecting the first and second gearboxes together in opposing transmission directions.

16. The method of claim 13, further comprising connecting the first and second gearboxes directly in a torque-transmitting manner to the drive unit or the output unit.

17. A control unit for outputting an actuating command for an actuator of a testing device, said control unit configured to carry out a testing method as set forth in claim 13.

18. A computer program product embodied in a non-transitory computer readable medium stored in a memory of a control unit for establishing a test force and/or a test torque for testing of gearboxes in a test run and for outputting a control command for an actuator of a testing device, said computer program product comprising a computer program when loaded into a processor of the control unit and executed by the processor, causes the processor to perform a method as set forth in claim 13.

\* \* \* \* \*

UNITED STATES PATENT AND TRADEMARK OFFICE
CERTIFICATE OF CORRECTION

PATENT NO. : 12,326,380 B2
APPLICATION NO. : 17/796546
DATED : June 10, 2025
INVENTOR(S) : Flemming Kjaer Christensen and Matthias Deicke Page 1 of 1

It is certified that error appears in the above-identified patent and that said Letters Patent is hereby corrected as shown below:

On the Title Page

Under item (73) Assignees:
Correct "Vestas Wind Systems A/S, Aarhaus N (DK)" to read --Vestas Wind Systems A/S, Aarhus N (DK)--.

Signed and Sealed this
Fifteenth Day of July, 2025

Coke Morgan Stewart
*Acting Director of the United States Patent and Trademark Office*